Aug. 7, 1945.   S. W. ALDERFER   2,381,387
OVEN FOR MANUFACTURING CONTINUOUS RUBBER ARTICLES
Original Filed Aug. 26, 1938   2 Sheets-Sheet 2
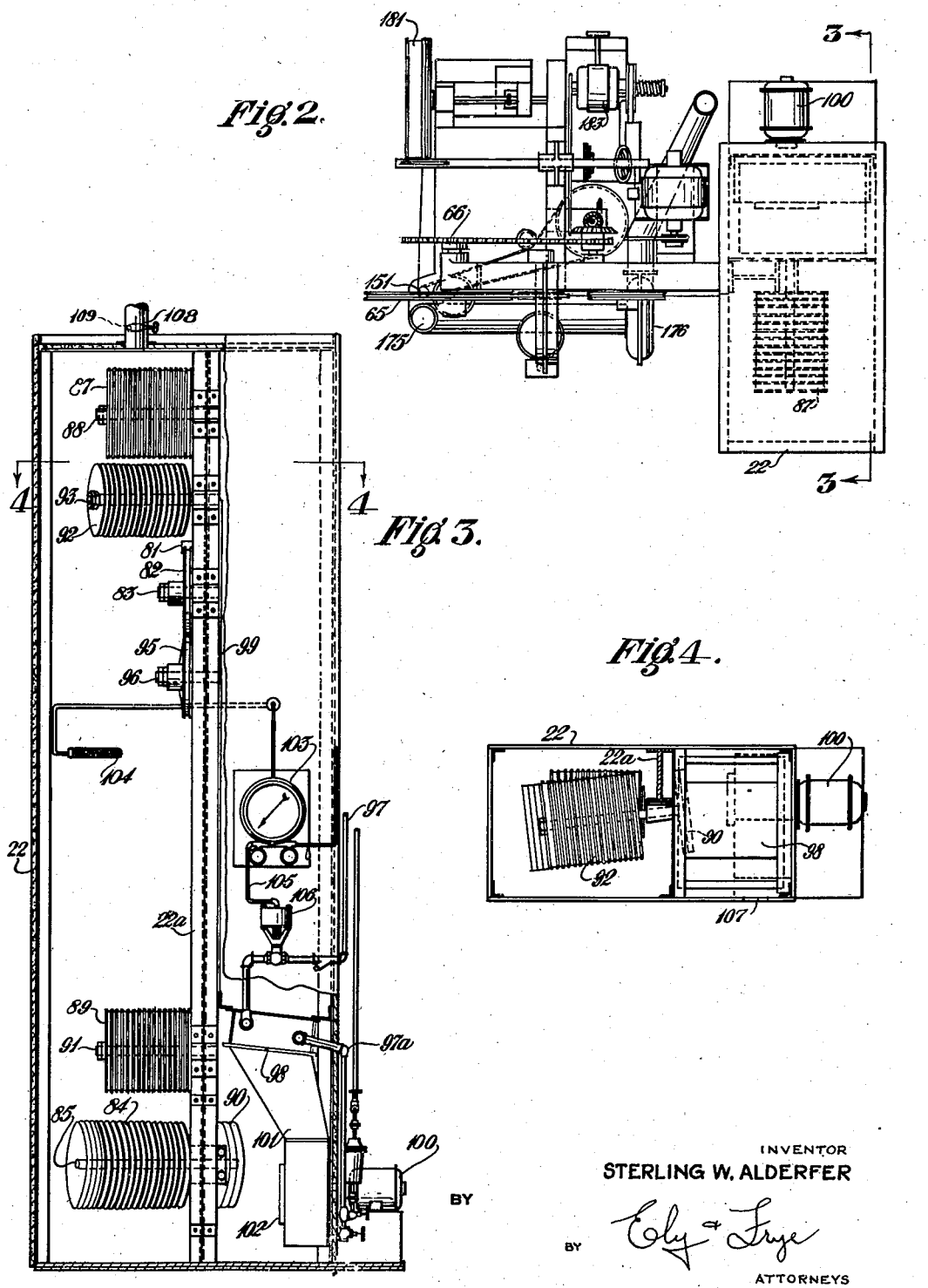
INVENTOR
STERLING W. ALDERFER
ATTORNEYS Patented Aug. 7, 1945

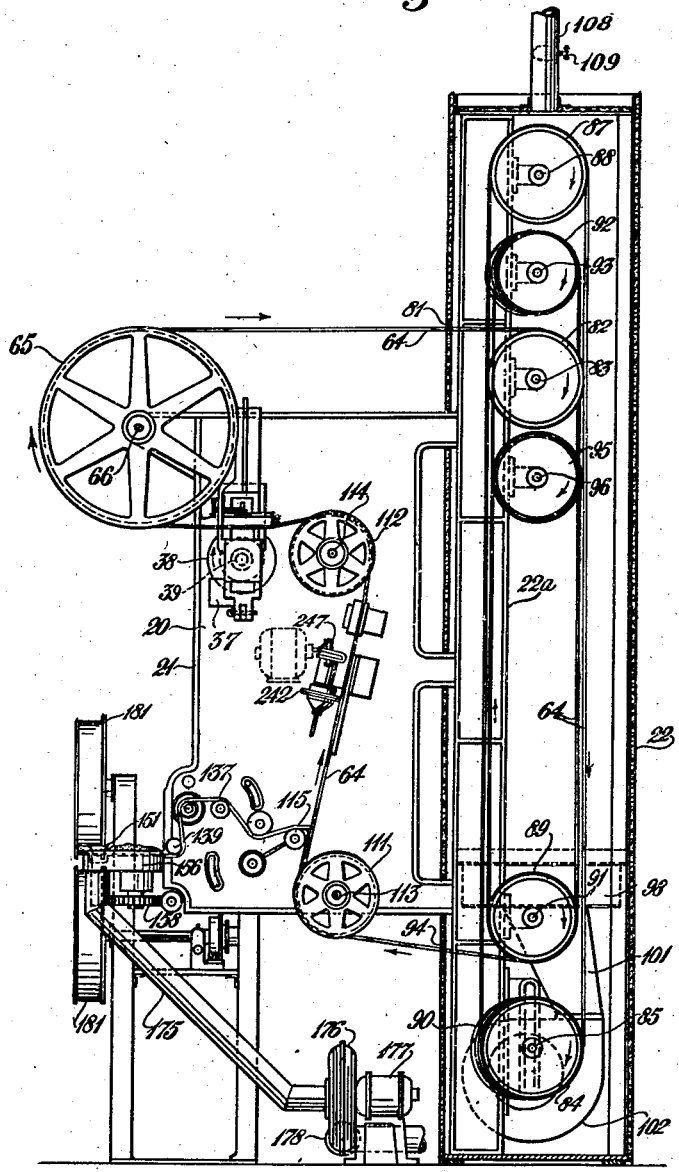

2,381,387

UNITED STATES PATENT OFFICE 2,381,387

OVEN FOR MANUFACTURING CONTINUOUS RUBBER ARTICLES

Sterling W. Alderfer, Akron, Ohio, assignor to The Firestone Tire & Rubber Company, Akron, Ohio, a corporation of Ohio Original application August 26, 1938, Serial No. 226,954. Divided and this application May 21, 1942, Serial No. 443,913

3 Claims. (Cl. 34—48)

This invention relates to apparatus for producing continuous rubber articles such as threads, tubing, strips, or the like, and has for its object the provision of novel apparatus for rapidly and efficiently drying wet continuous strip material.

In accordance with this invention there is provided an improved apparatus for producing continuous rubber articles, such as threads, strips, tubes or the like, comprising an endless belt arranged to be mounted for movement along a portion of a frame, and associated with means for depositing a film of latex upon said belt as it is drawn by said frame, and means for drying the latex into a rubber strip, and including means for pulling said rubber strip from said belt and stretching it, and wind up means for collecting said rubber strip.

In accordance with a further feature of the invention, the improved apparatus comprises an endless belt associated with means for depositing latex continuously on said belt, and means for drying the latex to form a strip of rubber coagulum therefrom, and includes means for pulling said rubber strip from said belt and for stretching the strip, means for rolling the stretched strip of rubber coagulum laterally upon itself to form a rubber thread, and means for collecting the tensioned rubber thread.

The invention also provides an improved apparatus of the character described comprising a rotatable disk mounted to dip a portion of its peripheral surface into latex in a tank, and an endless belt for receiving latex continuously from said disk and means for changing the speed of rotation of said disk whereby the amount of latex deposited upon said belt can be varied.

The invention further provides an improved apparatus in which the rubber is drawn through a predetermined path, comprising a support positioned adjacent the path of the continuous rubber article and carrying a dusting material positioned to project into the path of the rubber, and means for rotating said support whereby the rubber continuously is cutting a new path through said dusting agent.

In order that this invention may be clearly understood and readily carried into effect, the same will now be described more fully with reference to the accompanying drawings, illustrating, by way of example, one embodiment of the invention, and in which Figure 1 is an elevation of apparatus embodying the invention, with a side of the drying oven removed;

Figure 2 is a plan view of Figure 1;

Figure 3 is a vertical cross section of the oven, partly in elevation, taken on line 3—3 of Figure 2, with the endless belt removed; and Figure 4 is a transverse cross section taken on line 4—4 of Figure 3.

The invention resides in a drying oven which may be associated with a machine that is adapted to deposit latex continuously upon an endless metal belt and then form a rubber thread or other continuous product therefrom. The belt is run through the oven in which the belt is formed into convolutions to provide a maximum length of belt travel in a relatively small oven, the latex being converted into rubber coagulum in the oven. The belt is led from the oven and the rubber strip is pulled therefrom and drawn over a plurality of pulleys which progressively stretch the rubber strip. Next the stretched strip of rubber is rolled upon itself to form a solid rubber thread, when that is the desired product, after which a portion of the tension in the stretched rubber thread usually is removed, to reduce the per cent elongation of the rubber. Then the rubber thread is automatically dusted and wound on a drum. Means are associated with the endless belt for removing the strip of rubber coagulum to prevent fouling of the machine in case such rubber is not pulled therefrom by the pulleys in the customary manner. The amount of latex deposited upon the endless belt is made variable, so that a strip of rubber coagulum of the desired size may be formed by the apparatus of the invention.

Referring to the drawings, Figure 1 shows the general layout of the thread making machine 20 which includes a main frame 21 and a suitably insulated drying oven 22. A disk 38, carried on a shaft 39 that is journalled in the frame 21, picks up a film of latex from a tank 37 and deposits a uniform, continuous film of latex on an endless metal belt 64. Belt 64 passes around a sheave 65 that is secured to a shaft 66 journalled in the frame 21.

The endless belt 64, carrying the film deposited thereon by the disk 38, is drawn directly from the sheave 65 into the drying oven 22 through a small opening 81 in the side of the oven. The belt passes over a sheave 82 which is mounted in the oven adjacent the center support 22a thereof on a journalled shaft 83. In order to provide a long length of belt travel in the oven, a plurality of pulleys are carried by shafts in the oven at the top and bottom thereof with certain pulleys being larger than others to provide apparatus for forming two sets of concentric convolutions of the belt 64 in the oven. Thus, the belt 64 is drawn from the sheave 82 to an aligned end sheave of a plurality of sheaves 84 that are carried upon a single shaft 85 at the base of the oven. The shaft 85 positions the sheaves 84 at a slight angle to the plane of the oven 22, so that the belt 64 in being drawn over one of the sheaves 84 has its transverse position in the oven 22 moved approximately the width of one sheave. From the first sheave 84 that it contacts, the belt 64 is led to the corresponding aligned sheave of a plurality of sheaves 87, all of which are carried by a shaft 88, suitably journalled in the frame adjacent the top of the oven. The sheave 87 directly above the sheave 82 is only used for spacing purposes in the present construction. Then the belt 64 is led from the sheave 87 which it contacts to the aligned member of the sheaves 84 which moves the belt transversely and aligns it with a second sheave of the sheaves 87. This is repeated until the belt 64 has been drawn around all of these sheaves.

From the end member of the sheaves 87, the belt is led to an aligned member of a plurality of sheaves 89 that are carried by a shaft 91 that is journalled on the center support 22a adjacent the bottom of the oven but which is above and substantially aligned with the shaft 85. The belt then passes to the aligned sheave of a plurality of sheaves 92 that are secured to a shaft 93 which is journalled in the oven 22 adjacent the top thereof, but underneath the shaft 88. The adjacent sheaves may be spaced by discs, if desired. Figure 3 shows that the shaft 93 mounts the sheaves 92 at a slight angle to the sheaves 89 to provide transverse movement of the belt 64 to align it with the next member of the sheaves 89. The belt is drawn around the sets of sheaves 89 and 92 until all of the sheaves 89 have been utilized, and then the belt is drawn from the oven 22 through a small opening 94 in the side of the oven. In the last convolution of the belt in the oven, the belt is drawn over a sheave 95 which is journalled on a shaft 96 that is aligned with and below the sheave 82. This is necessary, since the sheave 82 is directly in the path of the loop of the belt formed around the last sheave 89 so that the loop must be cut off below the sheave 82. Figure 1 illustrates how the plurality of convolutions of the belt are formed in the oven by making the sheaves 82, 84, and 87, larger than the sheaves 89, 92, and 95, whereby the first set of convolutions is formed around the larger sheaves and the second series of convolutions is formed inside the first.

The desired tension is maintained upon the belt 64 by hanging the shaft 85 and sheaves 84 in the belt's convolutions with weights 90 being placed on the shaft 85 to aid in tensioning the belt. The shaft 85 is therefore only positioned by the center support 22a and permitted to move vertically relative thereto.

Any latex carried upon the belt 64 in its travel through the oven 22 must be formed into a rubber coagulum, and any suitable means for supplying heat to the oven 22 are provided for this purpose. In the embodiment illustrated, steam heat is used and this is provided through a pipe 97 which provides steam to a radiator 98 which is in the flue formed in the oven by a baffle plate 99, which extends upwardly from the top of the radiator 98 to a region near the journaled end of the shaft 93. Steam is exhausted from the radiator through pipe 97a which has a water trap therein. Air is circulated through the oven 22 by a blower 100 which connects to the radiator 98 by a conduit 101. The blower draws air through a door 102 in the conduit and forces it through the radiator and up into the flue formed by the baffle plate 99. Then the air is forced down through and around the convolutions of the belt 64 and finally is drawn back into the conduit 101. Fresh air enters the casing 22 through a duct 107, and moist air leaves the oven through a vent pipe 108 having a damper 109 for controlling the rate of venting.

Control means, which may include a temperature control and recorder 103, are provided to regulate the flow of the steam through the radiator. The recorder 103 is of standard construction and includes a temperature sensitive member 104 which is positioned in the oven 22. The recorder controls the air pressure in a pipe 105, which connects to an air valve 106. This valve is connected in the steam pipe 97, so that variations in pressure in the pipe 105 control the setting of the valve 106 and thereby the steam flow through the radiator and temperature of the oven 22. Usually the latex should only be dried into a flat rubber strip in the oven and not be vulcanized appreciably while therein, the temperature of the oven and the speed of the belt being regulated to achieve this purpose.

The belt 64, carrying the strip of rubber coagulum, is drawn over a sheave 111 when it emerges from the oven 22 and then it passes over a sheave 112, adjacent the top of the frame 21, prior to completing its circuit i. e. passing over and immediately adjacent the disc 38. The sheaves 111 and 112 are secured to shafts 113 and 114, respectively, that are suitably journalled on the frame 21.

The strip of rubber on the belt 64 is drawn therefrom by a pulley 115 suitably supported on the frame 21, and suitably driven. The rubber strip is then stretched by means of pulleys 121 and 137, which are driven at speeds greater than the speed of pulley 115. A pulley 123, having a frusto-conical flange, receives and rolls the rubber strip laterally upon itself to form a thread in the manner described in my Patent No. 2,070,388 issued February 9, 1937. Thereafter, the rubber thread passes around a pulley 139 and through a pile of dusting material, such as soapstone, on a rotating table 156, and then around a pulley 151 to one of a pair of windup drums 181, 181. Excess dusting material on the rubber thread is drawn therefrom by an exhaust flue 175, connected to a centrifugal pump 176 that is driven by a motor 177; an output flue 178 is provided to dispose of the exhausted material. A suitable belt cleaning mechanism 242 is provided below sheave 112 to ensure that no rubber remains on the belt 64 after the rubber strip is removed therefrom by pulley 115.

This application is a division of my co-pending application Serial No. 226,954, filed August 26, 1938, now Patent No. 2,308,949, and reference is made thereto for a complete description of the thread or strip forming apparatus.

What is claimed is:

1. Apparatus for drying continuous strip material comprising a drying oven having a frame and inclosing walls, a plurality of sets of pulleys journaled in said frame and comprising a pair of outer sets and at least one pair of inner sets, the outer sets of said pulleys having larger diameters than the inner sets, two sets of said pulleys being slightly out of alignment with a majority of the remaining sets, an endless belt passing through said drying oven, said belt being looped around said outer sets of pulleys to form an outer set of convolutions embracing an inner set of convolutions of the belt looped around said inner sets of pulleys in the oven, means dividing the oven into two compartments intermediate the ends thereof, means for repeatedly circulating a volume of air through the oven compartments, heating means for the circulated air, and automatic control means for said heating means for maintaining a sufficiently high temperature in the oven to dry strip material carried through the oven upon said endless belt.

2. Apparatus for drying continuous strip material comprising a drying oven having a frame and inclosing walls, two pulleys outside the oven and two pulleys inside the oven each pulley having an axis and all said axes being parallel with one another, an endless conveyor belt passing partially around one of said pulleys without the oven and directly into the oven and partially around one of said pulleys within the oven, the belt proceeding in a path through the oven then passing partially around the second said pulley within the oven and directly out of the oven to and partially around the second of said pulleys without the oven, a plurality of sets of pulleys journaled in said frame and including a pair of outer sets and at least one pair of inner sets, the outer sets of pulleys having larger diameters than the inner sets, two sets of said pulleys being slightly out of alignment with a majority of the remaining sets, the path of the belt within the oven comprising an outer set of convolutions around an outer pair of sets of pulleys embracing an inner set of convolutions around an inner pair of sets of pulleys.

3. Apparatus for drying continuous strip material comprising a drying oven having a frame and inclosing walls, a plurality of sets of pulleys journaled in said frame, each set of pulleys comprising a plurality of sheaves mounted upon a common shaft, said sets of pulleys comprising a pair of outer sets and a pair of inner sets, the outer sets of said pulleys having larger diameters than the inner sets, one inner set and one outer set of the pulleys being slightly out of alignment with a majority of the remaining sets, an endless belt passing through the oven, the belt being looped about the outer sets of pulleys to form an outer set of convolutions proceeding in one direction, the belt being looped about the inner sets of pulleys to form an inner set of convolutions proceeding in an opposite direction.

STERLING W. ALDERFER.